(12) United States Patent
Kane

(10) Patent No.: US 7,104,572 B1
(45) Date of Patent: Sep. 12, 2006

(54) TAPPING SLEEVE WITH MECHANICAL JOINT CONNECTION

(75) Inventor: William L. Kane, Somonauk, IL (US)

(73) Assignee: Cascade Waterworks Manufacturing Co., Inc., Yorkville, IL (US)

( * ) Notice: Subject to any disclaimer, the term of this patent is extended or adjusted under 35 U.S.C. 154(b) by 106 days.

(21) Appl. No.: 10/974,526

(22) Filed: Oct. 27, 2004

(51) Int. Cl.
*F16L 5/00* (2006.01)

(52) U.S. Cl. .................. 285/199; 285/411; 285/197

(58) Field of Classification Search ........ 285/411–416, 285/28, 368, 197–199, 180
See application file for complete search history.

(56) References Cited

U.S. PATENT DOCUMENTS

| 95,621 | A | 10/1869 | Weyermann |
|---|---|---|---|
| 896,333 | A | 8/1908 | Smith |
| 1,535,294 | A | 4/1925 | Collins |
| 1,806,710 | A | 5/1931 | Ross, Jr. |
| 1,873,621 | A | 8/1932 | Moore |
| 2,608,992 | A | 9/1952 | Folmsbee et al. |
| 3,415,547 | A | 12/1968 | Yano |
| 3,433,509 | A | 3/1969 | Jeffery et al. |
| 3,480,300 | A | 11/1969 | Jeffery et al. |
| 3,720,428 | A | 3/1973 | Zastawny |
| 4,059,291 | A | 11/1977 | Acda et al. |
| 4,070,046 | A | 1/1978 | Felker et al. |
| 4,128,107 | A | 12/1978 | Blumhardt |
| 4,191,216 | A | 3/1980 | Connolly |
| 4,429,708 | A | 2/1984 | Strueh |
| 4,471,979 | A * | 9/1984 | Gibb et al. ............. 285/411 |
| 4,610,471 | A | 9/1986 | Halen et al. |
| 4,637,641 | A | 1/1987 | Kennedy, Jr. |
| 4,638,834 | A | 1/1987 | Montgomery |
| 4,741,356 | A | 5/1988 | Letzo et al. |
| 5,040,828 | A | 8/1991 | Kane |
| 5,052,431 | A | 10/1991 | Jiles |
| 5,174,615 | A | 12/1992 | Foster et al. |
| 5,896,885 | A * | 4/1999 | Svetlik ............. 285/197 |
| 6,019,398 | A | 2/2000 | Powers |
| 6,065,784 | A | 5/2000 | Lundstrom |
| 6,565,125 | B1 | 5/2003 | Robison, Jr. |
| 6,648,377 | B1 * | 11/2003 | Marandi ............. 285/197 |
| 6,659,511 | B1 | 12/2003 | Yoneyama et al. |

\* cited by examiner

*Primary Examiner*—Aaron Dunwoody
(74) *Attorney, Agent, or Firm*—Thomas E. Hill; Emrich & Dithmar LLC

(57) ABSTRACT

Plural spaced projections attached to the outer surface of a branch pipe of a tapping sleeve positioned on a main water line are disposed in contact with a rubber gasket also positioned on and disposed about the branch pipe. A two-piece split gland is also positioned about the branch pipe and engages a first surface of each of the projections. The split gland is adapted for coupling to the flange of a mechanical joint tapping valve by plural nut and bolt combinations for urging the gasket into intimate contact with a second opposed surface of each of the projections and the tapping sleeve's mechanical joint in forming a seal with the branch pipe. The split gland coupling allows for vertically orienting the tapping sleeve even when the main water line is not level, or horizontal, to facilitate tapping valve access via an extension pipe when the tapping sleeve is buried.

31 Claims, 6 Drawing Sheets

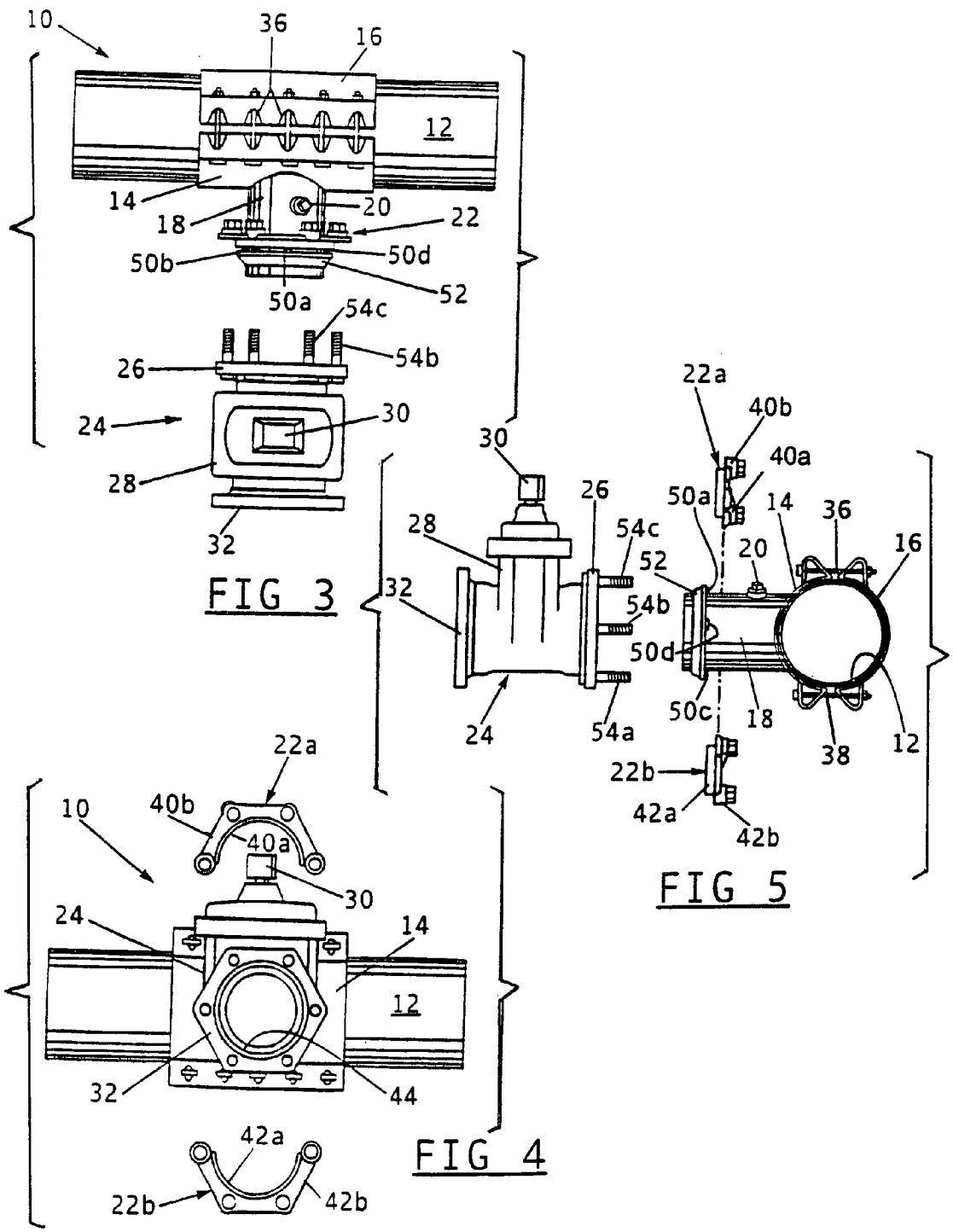

TAPPING SLEEVE WITH MECHANICAL JOINT CONNECTION

FIELD OF THE INVENTION

This invention relates generally to fluid carrying pipes, or conduits, and is particularly directed to a tapping sleeve with a mechanical joint connection for use with a main water line.

BACKGROUND OF THE INVENTION

In a water distribution system, it is frequently necessary to provide another branch in the system to direct water to a new location for additional users. In order to form the new branch, a tapping sleeve is positioned about the main water line for connecting the main water line to the new branch. A tapping valve is frequently connected between the tapping sleeve and the new branch for regulating water flow in the branch. The main water line is then tapped in a sealed manner allowing water to flow into the branch via the tapping sleeve and the tapping valve combination.

The tapping sleeve is typically comprised of stainless steel or A-36 carbon steel and is attached to the tapping valve by means of a flange welded to the tapping sleeve's branch pipe and connected to the tapping valve by plural nut and bolt combinations. In order to reduce the cost of tapping a water main, tapping valves having a mechanical joint are increasingly being used in combination with the tapping sleeve. The use of a tapping valve with a mechanical joint standardizes the tapping valve/tapping sleeve connection and avoids the requirement for specially designed tapping valves which are expensive and frequently in scarce supply. In some cases, a stainless steel flange is incorporated in the tapping sleeve for connection to the flanged joint of the tapping valve. While reducing the cost of the connection by using a mechanical joint tapping valve, commonly known as an MJ×MJ tapping valve, this arrangement also tends to increase the cost of the tapping sleeve/tapping valve connection by requiring the passivation, i.e., acid washing of the welded stainless steel, of the entire tapping sleeve/flange combination.

In order to avoid the cost of incorporating a coupling flange in a tapping sleeve for connection to the mechanical joint of a tapping valve, some approaches use a metal gland attached to the tapping sleeve and adapted for connection to a flange on the tapping valve. These types of glands are typically positioned on the tapping sleeve using plural spaced projections disposed on and about the branch pipe. Plural spaced recesses disposed on an inner portion of the gland are each adapted to engage one of the aforementioned projections for fixedly positioning the gland on the branch pipe. The gland is then connected to the tapping valve by means of plural nut and bolt combinations, as is conventional. In this arrangement, positioning the gland on the branch pipe and connecting the gland to the tapping valve is done with some difficulty, particularly where access is limited as in excavated underground locations where these types of water system tapping sleeves are most commonly used. In addition, the orientation of the gland and tapping valve combination is fixed on the branch pipe by the location of the spaced projections thereon. This typically results in non-vertical orientation of the attached tapping valve when the main water line is not level, or horizontal. Because the tapping valve is typically buried at a depth on the order of 6 feet, manipulating a non-vertical tapping valve to control water flow by means of an extension pipe with an attached stem nut inserted through a conduit extending from the surface of the ground down to the tapping valve is very difficult, and frequently impossible.

Another approach employs a metal ring fixedly attached to the outer surface of the branch pipe and disposed between the tapping sleeve's gland and the tapping valve's flange and engaging the joint's seal, or gasket. The metal ring is typically formed by stamping or by plasma cutting and is welded to the branch pipe in a typically time-consuming process. The cost of these operations constitutes a substantial portion of the manufacturing expense of the mechanical joint coupling.

The present invention avoids the aforementioned limitations of the prior art by providing a tapping sleeve for forming a sealed connection with a mechanical joint tapping valve. The connection includes plural spaced projections attached to a branch pipe about its outer periphery in combination with a circular gasket also disposed about the branch pipe and in contact with the projections. A two-piece split gland is also disposed on the branch pipe and engages the projections and is adapted for secure connection to the tapping valve's mechanical joint by means of a flange and plural nut and bolt combinations to form a sealed connection between the tapping valve and branch pipe.

OBJECTS AND SUMMARY OF THE INVENTION

Accordingly, it is an object of the present invention to provide an improved sealed connection between a tapping sleeve and a tapping valve at reduced cost.

It is another object of the present invention to provide an economical and reliable mechanical joint coupling arrangement in a fluid carrying system between a tapping sleeve and a tapping valve.

It is yet another object of the present invention to provide a tapping sleeve with a mechanical joint connection to a tapping valve which allows for vertical orientation of the tapping valve regardless of the orientation of the main water line to which the tapping sleeve is connected.

Another object of the present invention is to facilitate connection of a tapping valve with a mechanical joint to a tapping sleeve in a sealed manner by using a two-piece split gland in combination with plural spaced projections attached to the branch pipe about its outer periphery and a gasket which allows the tapping valve to be attached at virtually any orientation.

Still another object of the present invention is to eliminate the requirement to use an expensive specialty tapping valve with a carbon steel or stainless steel tapping sleeve in a fluid carrying system and to rather use a low cost tapping valve having a mechanical joint with plural spaced metal projections disposed on the tapping sleeve's branch pipe, a gasket and a split gland in combination with the tapping sleeve.

A still further object of the present invention is to reduce the cost to manufacture and assemble a mechanical joint connection between a tapping sleeve attached to a main water line and a conventional, low cost tapping valve.

This invention contemplates an arrangement for connecting a branch pipe of a tapping sleeve with a tapping valve having a mechanical joint at both ends. The arrangement comprises plural spaced projections fixedly attached to and disposed about the branch pipe; a ring-like gasket engaging the plural projections and disposed about and in contact with the branch pipe; a two-piece split gland disposed about the branch pipe and engaging each of the plural spaced projections; and plural nut and bolt combinations inserted through the split gland and the tapping valve's mechanical joint for drawing together the split gland and the tapping valve's mechanical joint and urging the gasket into intimate contact with each of the plural spaced projections and the tapping valve's mechanical joint in connecting the branch pipe and tapping valve in a sealed manner.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 3 is a top plan view shown partially exploded of a tapping sleeve with a mechanical joint connection in accordance with the present invention;

FIG. 4 is a partially exploded side elevation view of the tapping sleeve with a mechanical joint connection of the present invention;

FIG. 5 is an exploded lateral view of the tapping sleeve with a mechanical joint connection of the present invention;

DETAILED DESCRIPTION OF THE PREFERRED EMBODIMENTS

Figure 2:
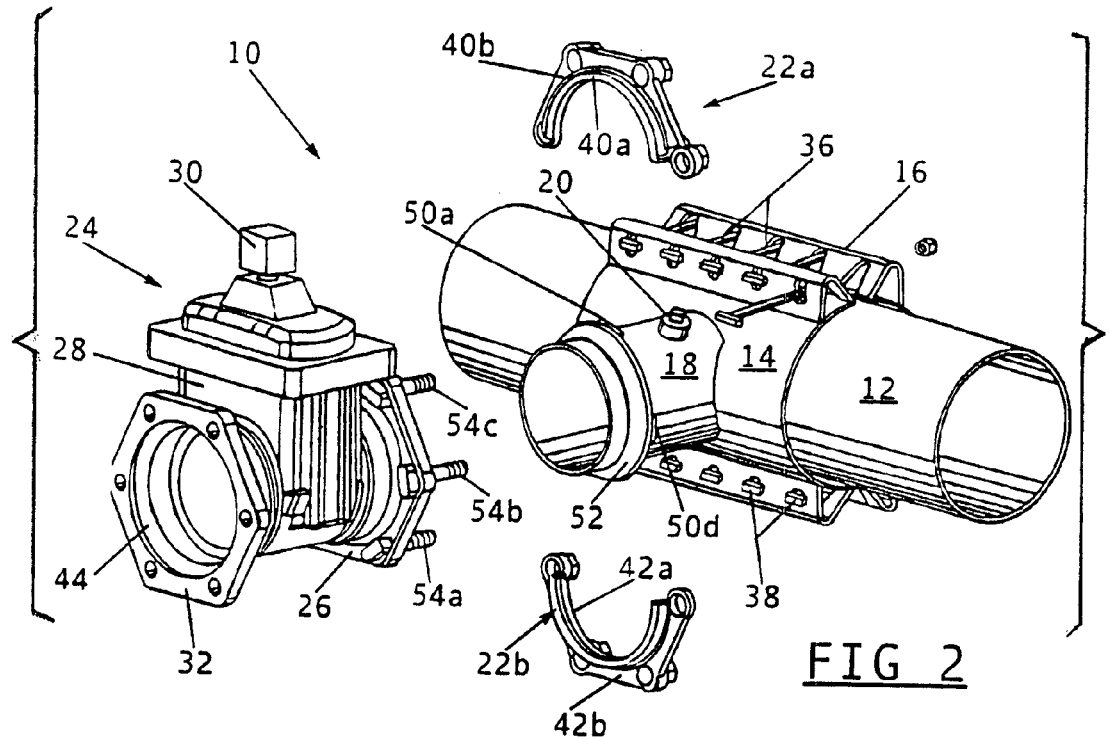
FIG. 2 is an exploded perspective view of the tapping sleeve with a mechanical joint connection shown in FIG. 1.
Figure 1:
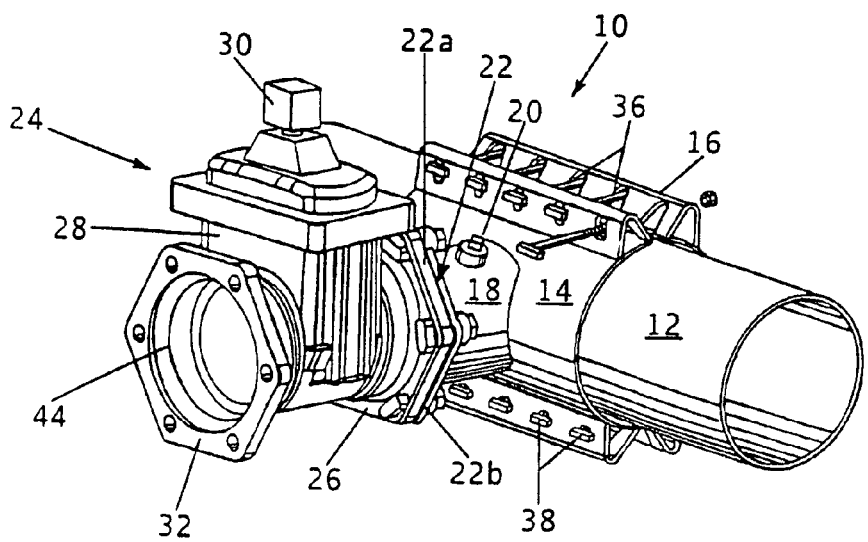
FIG. 1 is a perspective view of an assembled tapping sleeve with a mechanical joint connection in accordance with the principles of the present invention.
Figure 7:
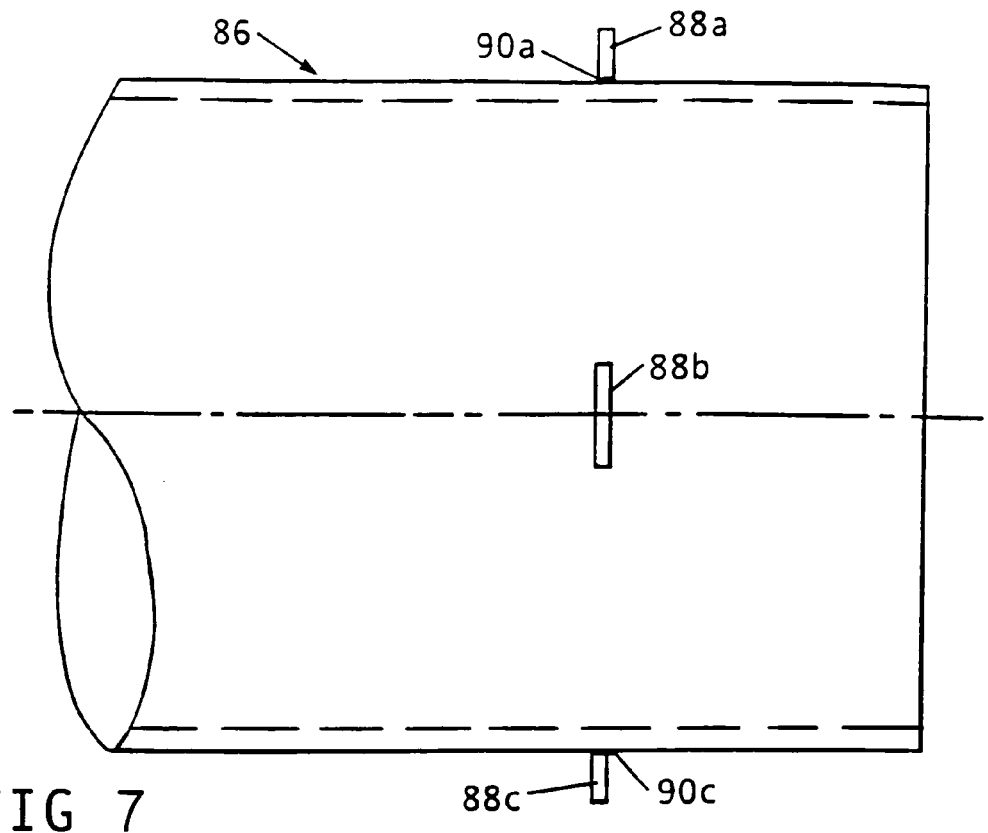
FIGS. 7 and 8 are respectively side plan and end-on views of a branch, or outlet, pipe having plural spaced projections disposed about its outer periphery in accordance with the present invention.
Figure 8:
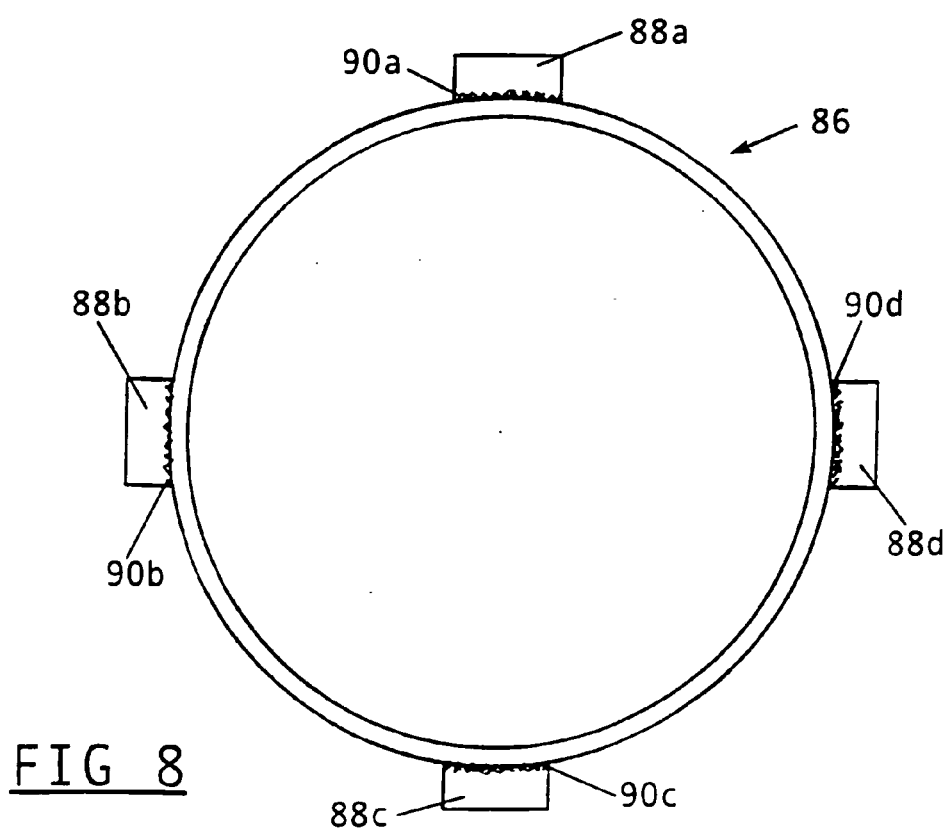
Figure 9A:
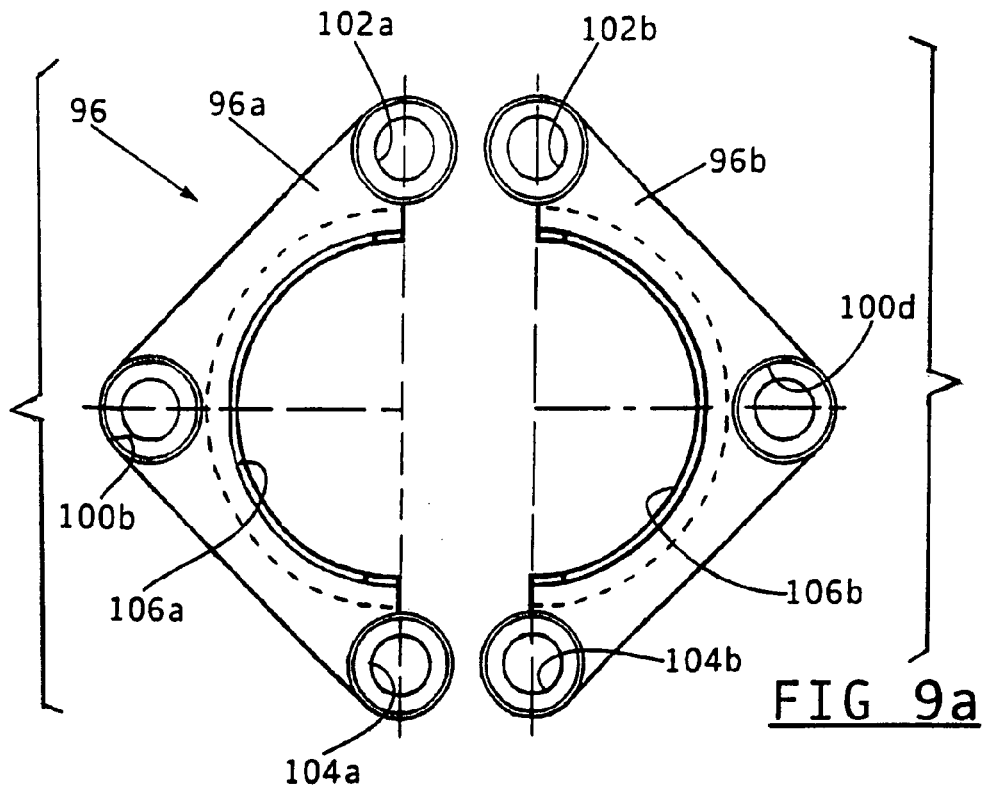
FIGS. 9a and 9b are respectively a plan view of an unassembled 4-inch diameter, four (4) bolt split gland and an end-on view of the four (4) bolt split gland positioned on a 4-inch diameter branch pipe in accordance with one embodiment of the present invention.
Figure 9B:
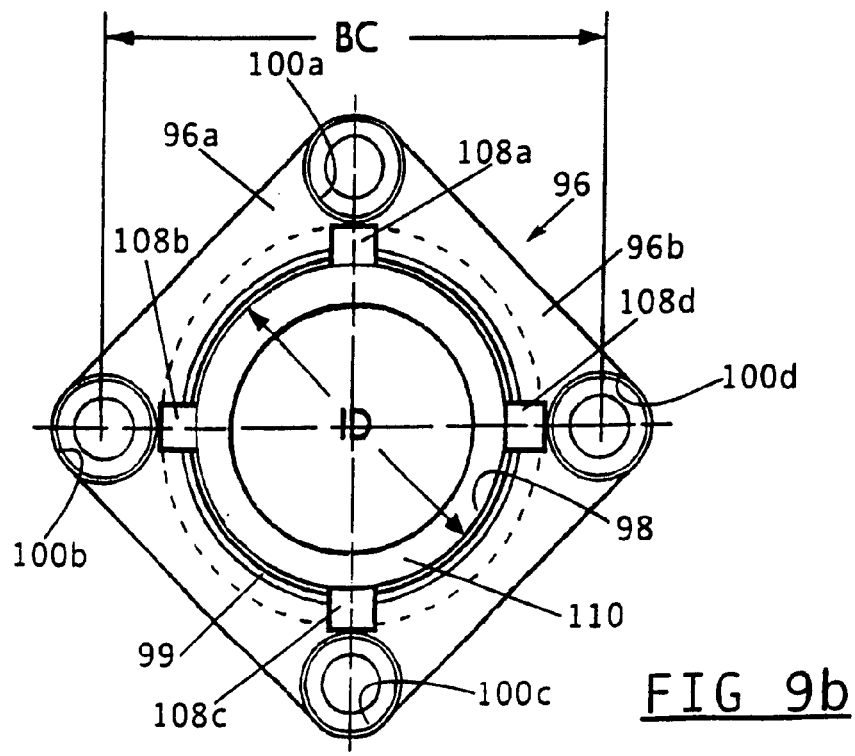
Figure 10A:
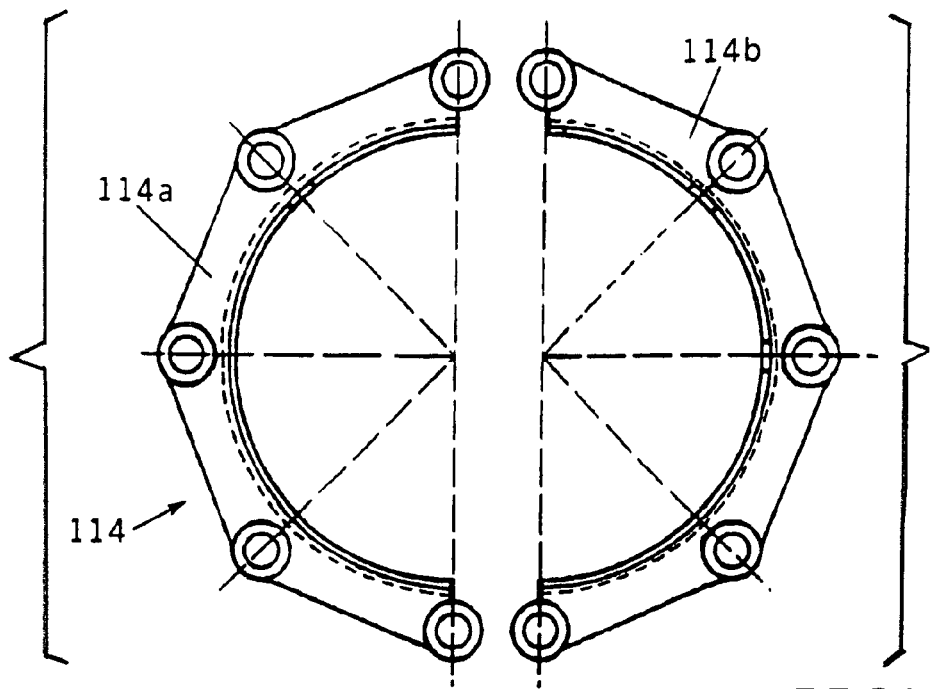
FIGS. 10a and 10b are respectively a plan view of an unassembled 10-inch diameter, eight (8) bolt split gland and an end-on view of an eight (8) bolt split gland positioned on a 10-inch diameter branch pipe in accordance with another embodiment of the present invention.
Figure 10B:
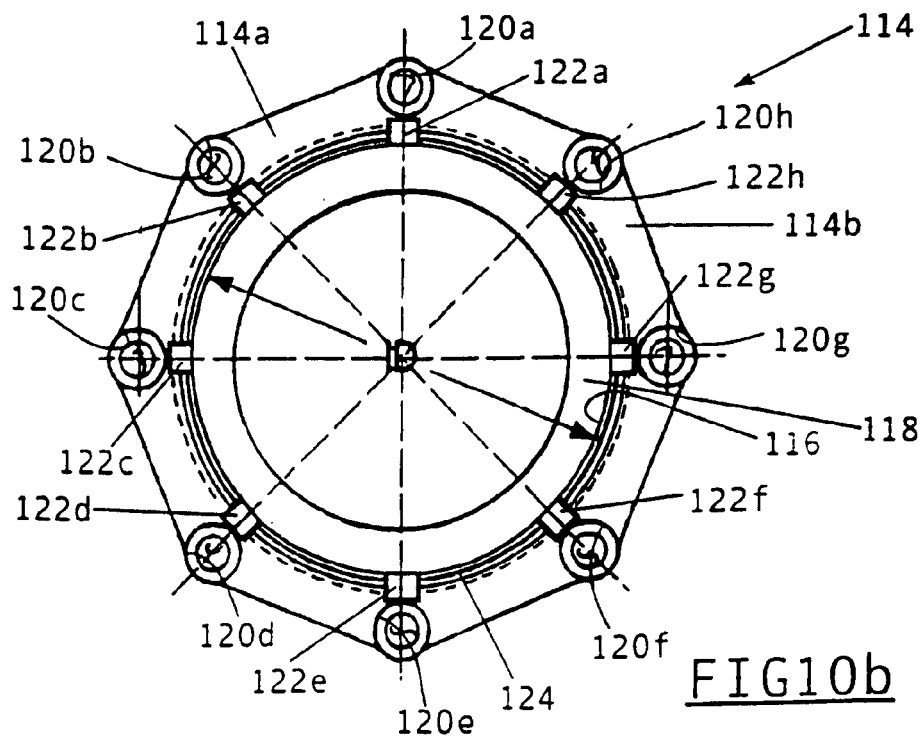

Referring to FIG. 1, there is shown a perspective view of a tapping sleeve 10 with a mechanical joint connection in accordance with the principles of the present invention. FIG. 2 is an exploded perspective view of the inventive tapping sleeve 10 shown in FIG. 1. FIGS. 3 and 4 are respectively partially exploded top plan and side elevation views of the inventive tapping sleeve 10. FIG. 5 is an exploded lateral view of the inventive tapping sleeve 10. FIGS. 7 and 8 are respectively side plan and end-on views of a branch pipe 86 having plural spaced projections 88a–88d disposed about its outer periphery in accordance with the present invention. FIGS. 9a and 9b are respectively a plan view of an unassembled 4-inch diameter, four (4) bolt split gland 96 and an end-on view of a four (4) bolt split gland positioned on a 4-inch diameter branch pipe 110 in accordance with one embodiment of the present invention. FIGS. 10a and 10b are respectively a plan view of an unassembled 10-inch diameter, eight (8) bolt split gland 114 and an end-on view of the eight (8) bolt split gland positioned on a 10-inch diameter branch pipe 118 in accordance with another embodiment of the present invention. The inventive tapping sleeve 10 will now be described in detail in terms of the aforementioned figures.

Tapping sleeve 10 is adapted for positioning on a main water line 12 by means of first and second half shells 14 and 16. The first and second half shells 14, 16 include upper and lower coupling flanges each adapted to receive plural combinations of nuts and bolts. Thus, the upper flanges of the first and second half shells 14, 16 are adapted to receive a first plurality of nut and bolt combinations 36, while the lower flange of each of the half shells is adapted to receive a second plurality of nut and bolt combinations 38. Attached to and extending from the first half shell 14 is a branch pipe 18. Branch pipe 18 includes a test outlet and plug 20. Securely attached to the outer surface of the branch pipe 18 such as by weldments (not shown) are four spaced projections 50a–50d. These projections 50a–50d may also be described as "tabs". Also disposed tightly about the outer surface of the branch pipe 18 is a gasket 52. Gasket 52 is positioned in contact with the four spaced projections 50a–50d and is disposed between the plural spaced projections and the distal end of the branch pipe 18. Gasket 52 is preferably comprised of rubber, nitrile or elastomeric material.

Also disposed about the branch pipe 18 and in contact with the four spaced projections 50a–50d is a two-piece split gland 22. The four spaced projections 50a–50d are thus disposed between and in contact with gasket 52 and split gland 22. Split gland 22 is comprised of a first semicircular gland member 22a and a complementary second semicircular gland member 22b. The first and second gland members 22a, 22b are placed about the branch pipe 18 in a loose-fitting manner. The first gland member 22a includes an inner flange 40a and an outer flange 40b. Similarly, the second gland member 22b includes an inner flange 42a and an outer flange 42b. The inner flanges 40a, 42a of the first and second gland members 22a, 22b are adapted to engage the four spaced projections 50a–50d. The outer flanges 40b, 42b of the first and second gland members 22a, 22b are each provided with plural apertures each of which is adapted to receive a respective nut and bolt combination for securely attaching a tapping valve 24 to the split gland 22.

Tapping valve 24 is conventional in operation and configuration and includes an inner housing 28 and first and second opposed end flanges 26 and 32. Disposed within the tapping valve's housing 28 is a valve stem, or shaft, 30 having a nut-like outer, exposed end and an inner end disposed within the fluid flow channel within the tapping valve 24. By engaging and rotating the valve stem 30, the fluid flow through the tapping valve 24 may be adjusted as desired.

The tapping valve's first flange 26 includes plural peripheral apertures each adapted to receive a nut and bolt combination for securely attaching tapping valve 24 to the branch pipe 18 by means of split gland 22. Thus, each of the apertures within the outer flanges 40b and 42b of the first and second gland members 22a and 22b is adapted to receive a respective nut and bolt combination which has been inserted through a respective aligned aperture within the first flange 26 of the tapping valve 24. This is shown for the case of nut and "T" head bolt combinations 54a, 54b and 54c inserted through the first flange 26 of the tapping valve 24 as well as through aligned apertures within split gland 22. As these nut and bolt combinations are tightened, tapping valve 24 is pulled toward split gland 22 which is in contact with the four spaced projections 50a–50d fixedly disposed on branch pipe 18. The four projections 50a–50d engage spaced respective portions of an annular surface of the gasket 52 and maintain the gasket in fixed position on branch pipe 18. The four projections 50a–50d are easily attached to the peripheral outer surface of branch pipe 18 by the aforementioned weldments. Disposed within the first flange 26 of tapping sleeve 24 is a mechanical joint which is not shown in the figures. However, a similar mechanical joint in the tapping valve's second flange 32 is shown as element 44 in FIGS. 1, 2 and 4. As tapping valve 24 and split gland 22 are drawn together by tightening of the aforementioned nut and bolt combinations, gasket 52 is drawn into intimate contact with the tapping valve's mechanical joint to form a seal between the tapping valve and branch pipe 18. The outer surface of gasket 52 is tapered so as to conform with the tapping sleeve's mechanical joint to insure a tight seal between tapping sleeve 24 and the gasket. The two-piece split gland 22 is easily placed on and maintained about branch pipe 18 as the plural nut and bolt combinations are inserted through aligned apertures within the split gland and the tapping valve's first flange 26 and tightened in forming a leak-proof seal. All of the components of the inventive tapping sleeve with mechanical joint connection are preferably comprised of cast ductile iron or cast stainless steel, or the four spaced projections 50a–50d may be comprised of a machined metal. Where the main water line 12 is not horizontal, or level, the combination of split gland 22 and tapping valve 24 may be rotated, or swivelled, about branch pipe 18 prior to tightening of the aforementioned nut and bolt combinations to align the tapping valve's stem 30 with vertical to facilitate engaging and rotating the valve stem by means of a stem nut and extension pipe combination (not shown).

Figure 6:
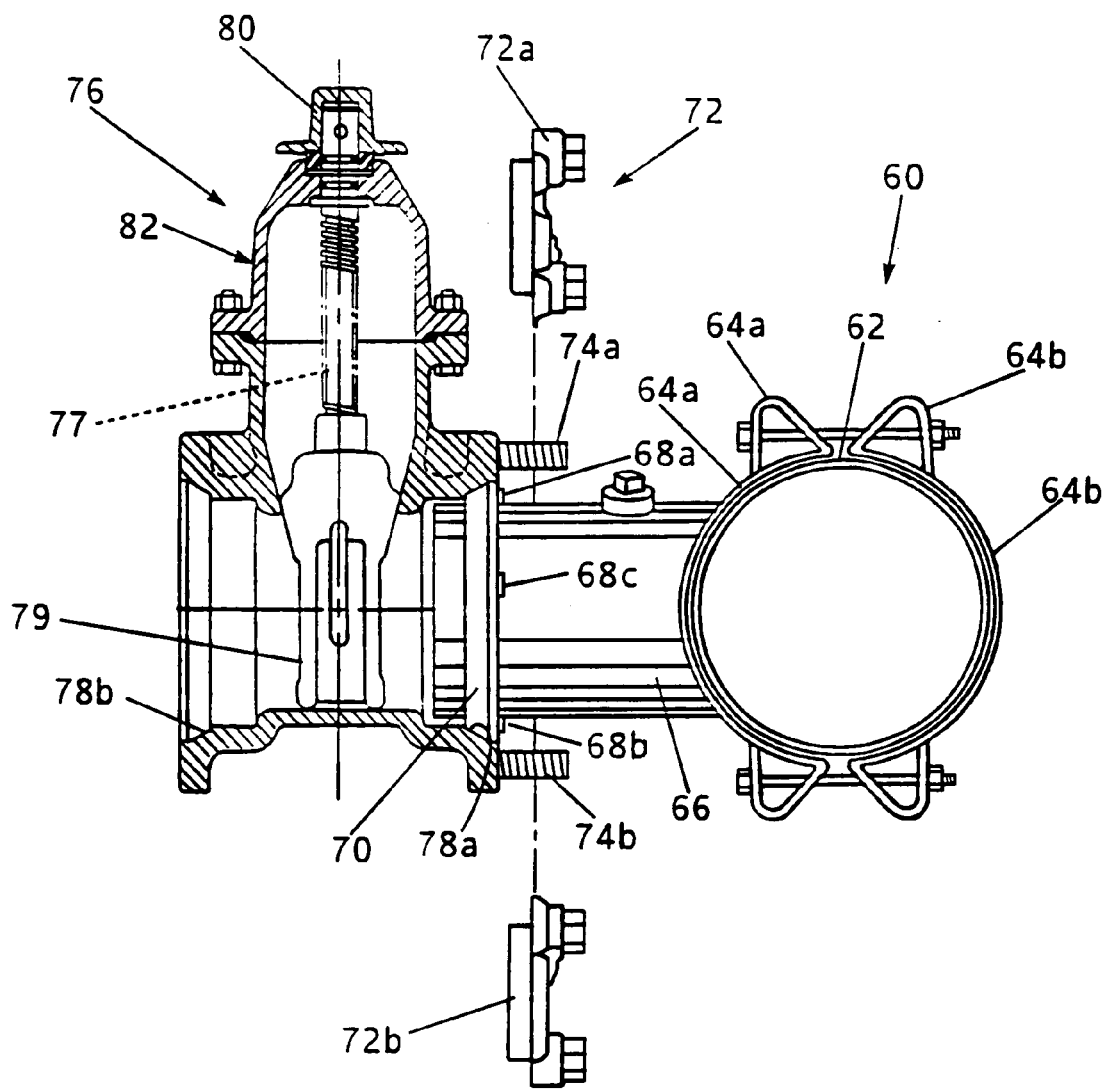
FIG. 6 is a side elevation view of a tapping sleeve with a mechanical joint connection to a flangeless tapping valve having a mechanical joint, where the tapping valve is shown in section.

Referring to FIG. 6, there is shown a side elevation view of a tapping sleeve 60 with a mechanical joint connection in accordance with the present invention connected to a flangeless tapping valve 76 having first and second mechanical joints 78a and 78b disposed on opposed ends thereof. As in the previously described embodiment, tapping sleeve 60 is positioned on a main water line 62 and includes first and second half shells 64a and 64b connected together and maintained in position on the water main line 62 by means of plural nut and bolt combinations. Attached to and extending from the first half shell 64a is a branch pipe 66. Fixedly positioned on the branch pipe 66 are four spaced projections, with only three shown in FIG. 6 as elements 68a, 68b and 68c, which are each securely maintained in position by means of a respective weldment (not shown in the figure for simplicity). Also disposed on and extending above the branch pipe is a gasket 70 which is positioned in contact with a first surface of each of the spaced projections. Also positioned and disposed about the branch pipe 66 is a two-piece split gland 72. Two-piece split gland 72 is comprised of first and second gland members 72a and 72b. Two-piece split gland 72 includes an inner flange for engaging second, opposed surfaces of the plural spaced projections and an outer flange having plural spaced apertures as in the previously described embodiment.

Tapping valve 76 is conventional in design and operation and includes a housing 82 having first and second mechanical joints 78a and 78b disposed on opposed ends thereof. Tapping valve 76 further includes a combination of a stem 77, a gate 79 and an operating nut 80. By rotating operating nut 80, the position of the gate 79 may be adjusted by means of stem 77 to allow water to flow from the main water line 62 via branch pipe 66. Further rotation of the operating nut 80 allows gate 79 to block the tapping valve 76 and prevent water from flowing through the tapping valve. As shown in the figure, the surface of the gasket 70 is contoured so as to tightly engage the tapping valve's first mechanical joint 78a to form a water-tight seal between the tapping valve 76 and tapping sleeve 60. Also as shown in the figure, plural nut and bolt combinations 74a and 74b are inserted through aligned apertures in the tapping valve's first mechanical joint 78a and the outer flange of the two-piece split gland 72 in forming a seal between the combination of the plural spaced projections and gasket 70 and the tapping valve's first mechanical joint. The four spaced projections (with three shown in FIG. 6 as elements 68a, 68b and 68c) engage gasket 70 and securely maintain it in fixed position on branch pipe 66 as the seal is formed.

Referring to FIGS. 7 and 8, there are respectively shown side plan and end-on views of a branch, or outlet, pipe 86 having plural spaced projections 88a–88d disposed about its outer periphery in accordance with the present invention. Branch pipe 86 is on the order of 4-inches in diameter and includes four spaced projections 88a–88d disposed about and attached to its outer surface. For larger diameter pipes, a greater number of spaced projections disposed about the pipe may be required as described below. Each of the four spaced projections 88a–88d is preferably comprised of a cast ductile iron, cast stainless steel or a machined metal. Each of the four-spaced projections 88a–88d is preferably ⅜ inch high, ¾ inch wide, and ⅛ inch thick. Each of the four spaced projections 88a–88d is securely affixed to the outer peripheral surface of the branch pipe 86 by means of a respective one of weldments 90a–90d.

Referring to FIGS. 9a and 9b, there are respectively shown a plan view of an unassembled 4-inch diameter, four (4) bolt split gland 96 and an end-on view of the four (4) bolt split gland positioned on a 4-inch diameter branch pipe 110 in accordance with one embodiment of the present invention. Split gland 96 is comprised of first and second gland members 96a and 96b. Each of the first and second gland members 96a, 96b includes a respective semicircular inner portion 106a and 106b. When the first and second gland members 96a, 96b are joined as shown in FIG. 9b to form split gland 96, the resulting structure includes an inner circular aperture 98. The inner circular aperture 98 is adapted to receive a branch pipe 110, with a small gap provided between the branch pipe and the inner surface of the split gland 96 defining the inner circular aperture 98 therein. The first gland member 96a is provided with circular apertures 102a, 100b and 104a. Similarly, the second gland member 96b is provided with circular apertures 102b, 100d and 104b. When the first and second gland members 96a, 96b are joined, the resulting split gland 96 includes four circular apertures 100a–100d, each of which is adapted to receive a respective bolt (not shown for simplicity) for connecting the split gland to a flange as described above. Aligned apertures 102a and 102b respectively disposed within the first and second gland members 96a, 96b form aperture 100a within the split gland 96. Similarly, apertures 104a and 104b respectively within the first and second gland members 96a, 96b when aligned in an overlapping manner form circular aperture 100c in split gland 96.

Disposed about the outer periphery of the 4-inch branch pipe 110 are four spaced projections 108a–108d in accordance with the present invention. Each of the four spaced projections 108a–108d is attached to the outer surface of the branch pipe 110 and is sized and spaced thereon as previously described. An inner flange 99 of the split gland 96 engages each of the plural spaced projections 108a–108d as previously described. Each of the four spaced projections 108a–108d is disposed adjacent to and aligned with a respective one of the bolt receiving apertures 100a–100d within split gland 96. The bolt receiving apertures 100a–100d are disposed in an outer flange of the split gland 96.

Referring to FIGS. 10a and 10b, there are respectively shown a plan view of an unassembled 10-inch diameter, eight (8) bolt split gland 114 and an end-on view of the eight (8) bolt split gland positioned on a 10-inch diameter branch pipe 118 in accordance with another embodiment of the present invention. As in the previously described embodiment, the two-piece split gland 114 is comprised of first and second connected gland members 114a and 114b. Each of the first and second gland members 114a, 114b includes an inner semicircular portion which forms a circular aperture 116 in the split gland 114 wherein the two gland members are connected as shown in FIG. 10b. Also, as in the previously described embodiment, each of the first and second gland members 114a, 114b includes plural circular apertures which form eight (8) bolt receiving apertures 120a–120h in the assembled two-piece split gland 114, as shown in FIG. 10b. The split gland's large circular aperture 116 is adapted to receive branch pipe 118. Disposed about and attached to the outer surface of the branch pipe 118 are eight spaced projections 122a–122h. An inner flange 124 disposed about the circular aperture 116 within the two-piece split gland 114 engages a flat surface of each of the eight spaced projections 122a–122h. Each of the eight spaced projections 122a–122h is disposed adjacent to and aligned with a respective one of the eight (8) bolt receiving apertures 120a–120h. The split gland bolt receiving aperture arrangement and spaced projection configuration on branch pipe 118 shown in FIG. 10b is incorporated in a split gland for use with branch pipe diameters of 6 inches, 8 inches, 10 inches and 12 inches. The present invention is not limited to the plural spaced projection and bolt receiving aperture configurations shown in FIGS. 9a, 9b and 10a, 10b as these are illustrated and described as examples of only two embodiments of the present invention. The present invention contemplates virtually any number of bolt receiving apertures in a split gland and virtually any number of plural spaced projections on a branch pipe for use in forming a sealed connection in a mechanical joint. In addition, any of the conventional split glands currently available may be used with the present invention.

While particular embodiments of the present invention have been shown and described, it will be obvious to those skilled in the relevant arts that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. An arrangement for connecting a branch pipe of a tapping sleeve with a tapping valve, said arrangement comprising:
   plural projections disposed in a spaced manner on an outer surface of the branch pipe;
   a ring gasket engaging said plural spaced projections and disposed about and in contact with the branch pipe, wherein said projections are disposed in contact with spaced portions of said gasket;
   a two-piece split gland disposed about the branch pipe and engaging each of said plural spaced projections; and
   plural nut and bolt combinations inserted through said split gland and a mechanical joint of the tapping valve for drawing together said split gland and the tapping valve's mechanical joint and urging said gasket into intimate contact with each of said plural spaced projections and the tapping valve's mechanical joint in connecting the branch pipe and tapping valve in a sealed manner.

2. The arrangement of claim 1 further comprising plural weldments each fixedly attaching a respective projection to the branch pipe.

3. The arrangement of claim 1 wherein said split gland includes a first inner flange disposed in contact with the branch pipe and engaging said plural spaced projections.

4. The arrangement of claim 3 wherein said split gland further includes a second outer flange disposed about said first flange and having plural spaced apertures each adapted to receive a respective nut and bolt combination.

5. The arrangement of claim 4 wherein each of the tapping valve's mechanical joint and the split gland's outer flange are generally square, hexagonal or octagonal in shape and includes four, six or eight apertures, respectively, for receiving plural nut and bolt combinations.

6. The arrangement of claim 4 wherein each of said plural spaced projections is aligned with and disposed adjacent to a respective aperture in the second outer flange of said split gland.

7. The arrangement of claim 1 wherein said gasket is comprised of rubber, nitrile or elastomeric material.

8. The arrangement of claim 1 wherein each of said plural spaced projections and said split gland is comprised of cast ductile iron or cast stainless steel.

9. The arrangement of claim 1 wherein each of said plural spaced projections is comprised of machined steel.

10. The arrangement of claim 1 wherein said gasket includes an outer peripheral surface contoured to intimately engage an inner surface of the tapping valve's mechanical joint.

11. The arrangement of claim 1 wherein said two-piece split gland has m sides and n apertures for receiving a respective nut and bolt combination, where m=n.

12. The arrangement of claim 11 wherein p projections are disposed in a spaced manner on the outer surface of the branch pipe and wherein each of said projections is aligned with and disposed adjacent a respective one of the apertures in said split gland.

13. The arrangement of claim 12 wherein m=m=p.

14. The arrangement of claim 1 wherein said split gland includes plural spaced apertures each adapted to receive a respective nut and bolt combination and wherein each of said projections is aligned with and disposed adjacent a respective one of the apertures in said split gland.

15. The arrangement of claim 1 wherein each of said projections is on the order of ⅜-inch high, ¾-inch wide and ⅛-inch thick.

16. A coupling arrangement for a fluid carrying pipe, said arrangement comprising:
   a tapping sleeve attached to the pipe and including a branch pipe for diverting fluid from the pipe;
   plural projections disposed about in a spaced manner and fixedly attached to said branch pipe;

a circular gasket disposed about and engaging said branch pipe, wherein said gasket is disposed in abutting contact with a respective first surface of each of said plural spaced projections;

a tapping valve having a mechanical joint with plural spaced apertures;

a coupling member disposed about said branch pipe and engaging a respective second opposed surface of each of said plural spaced projections and having plural spaced apertures; and plural nut and bolt combinations inserted in aligned apertures in said mechanical joint and said coupling member for drawing together and securely connecting said tapping valve and said coupling member, wherein said gasket is disposed in contact with the tapping valve's mechanical joint and wherein relative orientation between said tapping valve and the fluid carrying pipe may be fixed as desired by rotationally displacing said tapping valve about said branch pipe prior to tightening of said nut and bolt combinations.

17. The coupling arrangement of claim 16 further comprising plural weldments each fixedly attaching a respective plural spaced projection to the branch pipe.

18. The coupling arrangement of claim 16 wherein said gasket includes an outer peripheral surface contoured to intimately engage an inner surface of the tapping sleeve's mechanical joint.

19. The coupling arrangement of claim 16 wherein said coupling member comprises a two-piece split gland.

20. The coupling arrangement of claim 19 wherein said two-piece split gland includes first and second generally semicircular gland members.

21. The coupling arrangement of claim 20 wherein each of said first and second semicircular gland members includes a respective first inner flange disposed in contact with the branch pipe and engaging each of said plural spaced projections.

22. The coupling arrangement of claim 21 wherein each of said first and second semicircular gland members further includes a respective second outer flange disposed about an associated first inner flange and incorporating said plural spaced apertures each adapted to receive a respective nut and bolt combination.

23. The coupling arrangement of claim 22 wherein each of the tapping valve's flange and the split gland's second outer flange are generally square, hexagonal or octagonal in shape and respectively include four, six or eight apertures each adapted to receive a respective nut and bolt combination.

24. The coupling arrangement of claim 16 wherein said gasket is comprised of rubber, nitrile or an elastomeric material.

25. The coupling arrangement of claim 16 wherein each of said plural spaced projections and said split gland are comprised of cast ductile iron or cast stainless steel.

26. The coupling arrangement of claim 16 wherein each of said plural spaced projections is comprised of machined metal.

27. The coupling arrangement of claim 19 wherein said two-piece split gland has m sides and n apertures for receiving a respective nut and bolt combination, where m=n.

28. The arrangement of claim 27 wherein p projections are disposed in a spaced manner on the outer surface of the branch pipe and wherein each of said projections is aligned with and disposed adjacent a respective one of the apertures in said split gland.

29. The arrangement of claim 28 wherein m=m=p.

30. The arrangement of claim 16 wherein said coupling member is a split gland including plural spaced apertures each adapted to receive a respective nut and bolt combination and wherein each of said projections is aligned with and disposed adjacent a respective one of the apertures in said split gland.

31. The arrangement of claim 16 wherein each of said projections is on the order of ⅜-inch high, ¾-inch wide and ⅛-inch thick.

* * * * *